May 18, 1943. A. F. MITTERMAIER 2,319,251

REACTOR

Filed March 9, 1940 7 Sheets-Sheet 1

Inventor:
Armin F. Mittermaier,
by Harry E. Dunham
His Attorney.

May 18, 1943. A. F. MITTERMAIER 2,319,251
REACTOR
Filed March 9, 1940 7 Sheets-Sheet 2

Inventor:
Armin F. Mittermaier,
by Harry E. Dunham
His Attorney.

May 18, 1943. A. F. MITTERMAIER 2,319,251
REACTOR
Filed March 9, 1940 7 Sheets-Sheet 3

Inventor:
Armin F. Mittermaier,
by Harry E. Dunham
His Attorney.

May 18, 1943. A. F. MITTERMAIER 2,319,251
REACTOR
Filed March 9, 1940 7 Sheets-Sheet 4

Inventor:
Armin F. Mittermaier,
by Harry E. Dunham
His Attorney.

May 18, 1943. A. F. MITTERMAIER 2,319,251
REACTOR
Filed March 9, 1940 7 Sheets-Sheet 7

Inventor:
Armin F. Mittermaier,
by Harry E. Dunham
His Attorney.

Patented May 18, 1943

2,319,251

UNITED STATES PATENT OFFICE 2,319,251

REACTOR

Armin F. Mittermaier, Fort Wayne, Ind., assignor to General Electric Company, a corporation of New York Application March 9, 1940, Serial No. 323,235

16 Claims. (Cl. 29—84)

My invention relates to electromagnetic induction apparatus and methods and apparatus for producing the same.

It is an object of my invention to provide improved, but less expensive electromagnetic induction apparatus, such as reactors and transformers in smaller sizes particularly. Another object of my invention is to provide such apparatus which shall be quiet, have its laminations of magnetic sheet material tightly locked without the use of clamps or wedges and shall have improved insulation characteristics and definitely fixed air gaps. It is also an object to provide arrangements for fabricating the apparatus utilizing preformed electrical conductive winding structures or coils, and carrying on the fabricating operation either manually or automatically. Other and further objects and advantages will become apparent as the description proceeds.

In carrying out my invention in its preferred form I assemble stacked laminations with a preformed form-wound electrical coil. Two stacks of laminations are utilized which have legs projecting into the coil from opposite ends of the coil window and have a fixed air gap between the tip ends of the laminations. The laminations are E-shaped with the center legs of the E occupying the coil window, the yokes and outer legs of the E forming a shell surrounding the coil in a plane parallel to the electrical axis of the coil. For making a tight fit of the laminations in the coil window, the top and bottom pairs of laminations have their legs crimped or bent so that the springiness of the top and bottom laminations serves to clamp the laminations forming the core tightly together within the coil window as well as outside the coil window. The outside legs may be crimped slightly more than the inside legs in order to assure rigidity of the outside legs and freedom from vibration or noise in alternating current circuits.

In assembling the electromagnetic induction apparatus in accordance with what I now consider the preferred method, I proceed as follows: First, I form two vertical stacks of the E-shaped laminations with the outlines in registry and the open or unjoined legs of the E toward one another, and place a coil between the stacks of laminations at the lower end thereof. Then, I gauge or count out two groups each of a sufficient number of laminations for substantially filling the coil window, and push these groups of laminations from the bottoms of the respective stacks toward the coil, pushing the top and bottom pairs of laminations of each group in advance of the remainder of the group. Then, I bend the projecting tips inward to serve as guides, and push the entire groups of laminations as units toward the coil causing the center legs of the laminations to enter the coil window with the bent tips of the advanced laminations guiding the center legs into the coil window. I stop the outer pair of the laminations when a given air gap between approaching tips is attained and cause the lagging portions of the groups of laminations to follow the advanced top and bottom laminations to bring all the laminations of either group in registry.

The machine which I now consider to be a preferred form of apparatus for carrying out the assembling operation automatically includes a plate with a chamber for receiving an electrical coil, a pair of magazines for holding the stacked E-shaped laminations on either side of the coil chamber, and a mechanism for automatically gauging the laminations, and pushing them in place. The plate has a channel under the lamination magazines of a suitable width to permit laminations to drop into the channel and of suitable depth to receive the number of laminations which is intended to be inserted into the coil. A pair of plungers is slidably mounted in the channel for pushing the laminations from the bottom of the stack of laminations into assembling position and associated with the plungers are advancing fingers for picking out the top and bottom laminations from the group of laminations gauged by the plungers, and bringing these top and bottom laminations in position for bending the legs or forming crimps therein. The plate also has transverse channels in which hold-back blocks are slidably mounted with their tips properly dimensioned to hold back the main central portion of the groups of laminations while the advancing fingers are advanced. There is a pair of benders for producing the crimps in the arms of the advanced laminations. A cement reservoir with connecting ducts to the coil chamber may be provided, for depositing the requisite amount of cement in the coil window before the laminations are inserted. The plungers are so arranged as to continue the movement of the gauged laminations and insert the middle legs into the coil window. A gap spacer is provided at each side of the coil chamber to stop the motion of the laminations at a proper point to preserve the fixed air gap. Knockout pins rising vertically from positions on either side of the coil chamber are provided for ejecting the finished electromagnetic induction apparatus. All the movable parts are operated by cam mechanisms driven from a common motor and the cam mechanisms are provided with coasting and driving sections so as to cause the various elements to be driven forward and retracted in suitable sequence.

The invention will be understood more readily from the following detailed description when considered in connection with the accompanying drawings and those features of the invention which are believed to be novel and patentable will be pointed out in the claims appended hereto or in the claims appended to my copending application, Serial No. 355,525, filed September 5, 1940. In the drawings, Sheet 1, Figures 21 and 22 are perspective views and 23–26, inclusive, are longitudinal sectional views partially schematic illustrating the electrical coil and the magnetic laminations in successive stages of the assembling process. Figure 28 (Sheet 3) is an enlarged sectional view showing more in detail a portion of the apparatus of Figure 17, Sheet 5, to illustrate the operation of escape blocks provided to facilitate the gauging of the requisite stack of laminations by plungers. Sheet 7.

Like reference characters are used throughout the drawings to designate like parts.

Figure 1:
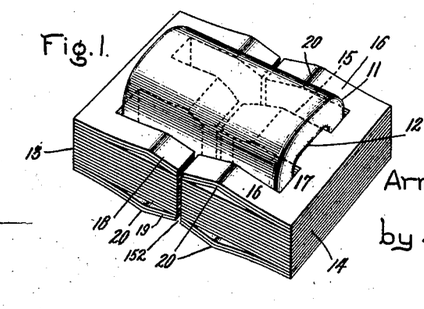
Figure 1, is a perspective view of a reactor constructed in accordance with one embodiment of my invention.
Figure 5:
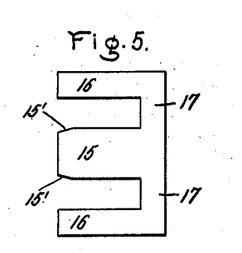
Figure 5 is a plan view of one of the E-shaped laminations employed in the apparatus of Figure 1. Sheet 3.

In the drawings, Figure 1 illustrates a completed device which may be either a reactor for use in apparatus such as fluorescent lamps or a transformer such as an audio transformer for radio purposes. In such types of apparatus it is desirable to maintain a certain predetermined air gap. For convenience the device will hereinafter be referred to as a reactor although my invention is not limited thereto. It comprises a conductive-winding structure or electrical coil 11 which is a preformed form-wound coil and may, therefore, be produced in a rapid, economical manner well known to the art with the requisite amount of insulation included therein. The coil 11 has a window for receiving a magnetic core. The complete magnetic circuit of the device illustrated in Figure 1 consists of magnetic core material substantially filling the coil window 12 and core material providing a magnetic return path around the outside of the coil 11. The magnetic circuit consists of a pair of E-shaped stacks of laminations 13 and 14. Each lamination of the stack is shown more in detail in Figure 5, having a middle leg or arm 15 which lies within the coil window, an outer leg or arm 16 and a yoke portion 17 joining the middle and outer legs. The end of the middle leg 15 of each lamination is preferably tapered as shown at 15' in order that the middle leg 15 may be guided into the coil window 12 more easily. In the manner which will be explained more in detail hereinafter laminations at the top and at the bottom, e. g., the top and bottom pairs of laminations 18 and 19 have the middle legs crimped toward each other to facilitate further guiding the middle leg of the group of laminations into the coil window. Although I have found it satisfactory to crimp two laminations at the top and two at the bottom of the group, my invention is not limited to this exact number. Not only the middle legs of the E-shaped laminations 18 and 19 but also the outer legs, as shown in Figure 1, may, if desired, be crimped for the purpose of causing the laminations to fit snugly into the coil window 12 and causing the outer legs 16 to be held tightly to prevent vibration and noise when an alternating current is applied to the electrical coil 11. The crimps in the outer legs are represented at 20 in Figure 1 and the middle legs have corresponding crimps. I have found it desirable to make the crimps in the outer legs somewhat sharper than the crimps in the middle arms.

Figure 21:
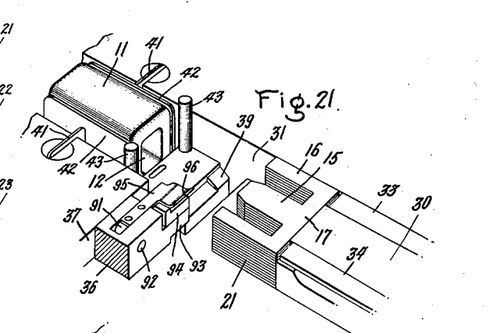
Figures 22, 23:
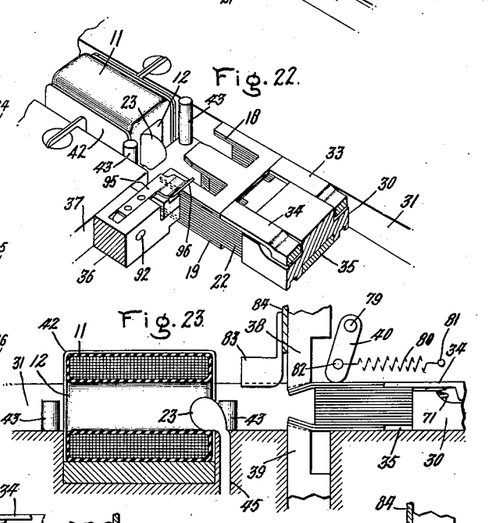
Figure 24:
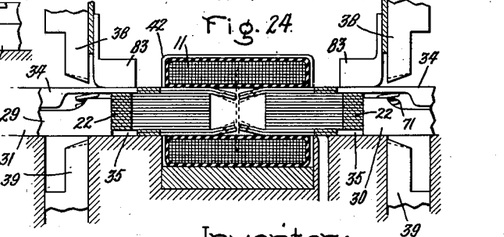
Figure 25:
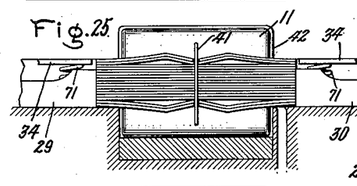

As will be described more specifically hereinafter one of the first steps in the method of assembling the laminations with the electrical coil consists briefly of gauging the requisite height of laminations to form half the core and to fill the coil window 12 substantially, thus forming a group of laminations 21 as illustrated in Figure 21, Sheet 6. The top and bottom pairs of laminations 18 and 19 are placed against the other laminations in the group in such a manner that the ends of the legs of the E project beyond the remainder of the laminations 22 in the group. This stage is illustrated in Figure 22. The ends of the legs of the laminations are bent over to form the crimps 20, which is the stage illustrated in Figure 23. Then the laminations in the groups of laminations 21 as units have the middle legs inserted into the coil window as illustrated in Figure 24. Thereafter, the main middle portion 22 of the group of laminations is pushed in to follow the upper and lower pairs of laminations 18 and 19 so that all of the laminations are in alignment as illustrated in Figure 25, resulting in the completed apparatus illustrated in Figure 1. For the purpose of preventing longitudinal vibration of the laminations in the direction of the magnetic axis of the coil and thus overcoming noise from this source, a suitable non-magnetic gap spacer may be inserted in the coil to fill the air gap. The gap spacer may be inserted either in solid or plastic form. Preferably before the laminations are inserted into an electrical coil a quantity of suitable cement 23 is placed opposite the coil window or within the coil window so that the cement 23 will fill the space within the coil window not occupied by the magnetic material, thus making certain that the laminations are very tightly held and cannot vibrate within the coil window and that there are no air pockets to retain or collect air, moisture or substances which may interfere with the insulation or cause corrosion. My invention is not, however, limited to utilizing both the features of crimped lamination legs and cement filling, as a tight rigid construction may be made by the use of one of these features alone.

Figure 2:
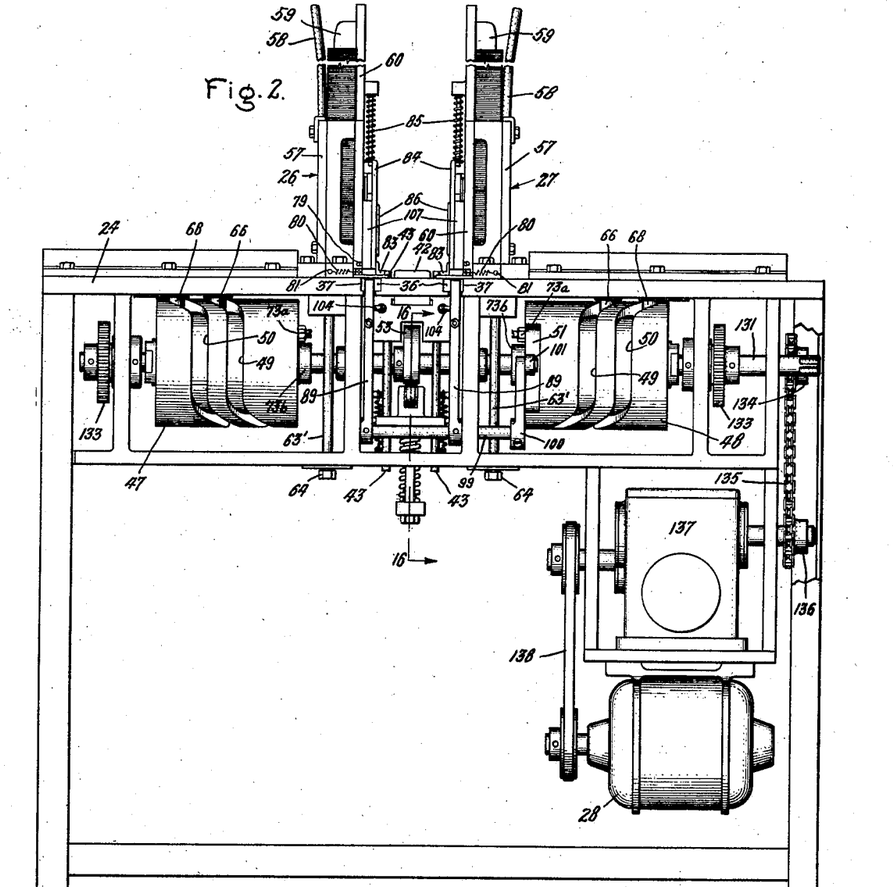
Figure 2 is a front elevation of a machine for assembling the electromagnetic induction apparatus of Figure 1. Sheet 2.
Figures 2B, 6, 7, 8:
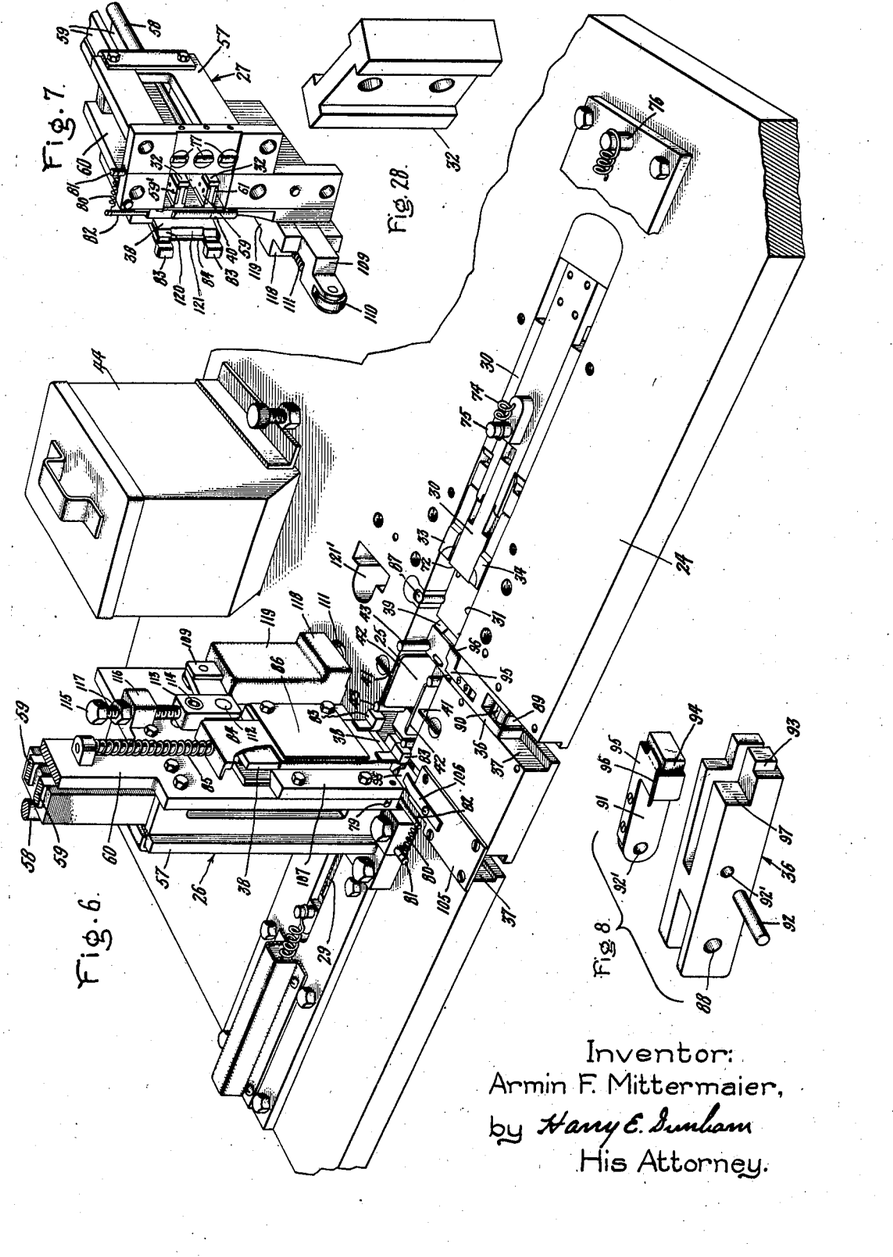
Figure 6 is a perspective view of the top portion of the machine with certain portions thereof broken away and with the right-hand lamination magazine removed.
Figure 7 is a fragmentary perspective view of the magazine and portions of the apparatus attached thereto which have been removed from the machine, as shown in Figure 6, and showing the magazine tilted in such a manner as to expose the lower end thereof.
Figure 8 is an exploded perspective view of the hold-back block. Sheet 4.
Figures 13, 14, 15, 16, 17, 18, 19, 20:
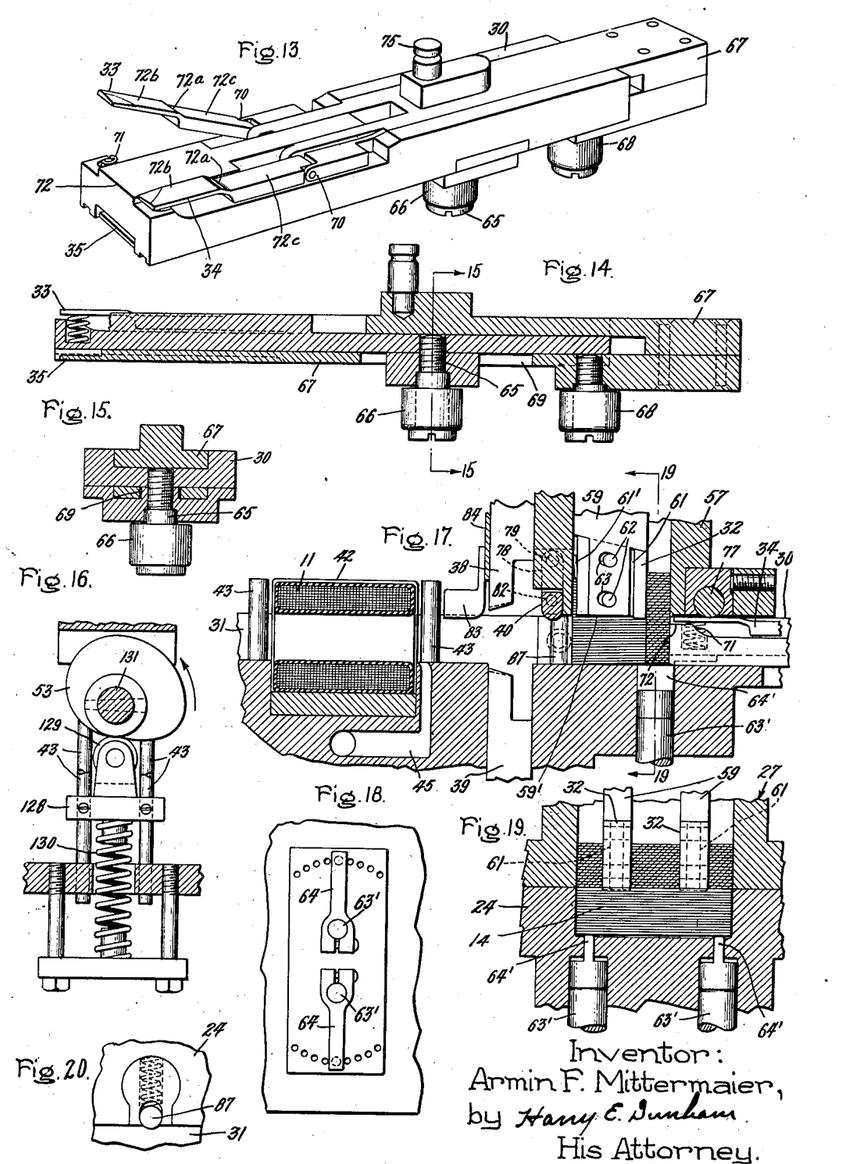
Figure 13, is a perspective view of the right-hand plunger and associated advancing fingers.
Figure 14 is a longitudinal vertical section cut by a plane bisecting the portion of the apparatus shown in Figure 13.
Figure 15 is a transverse vertical section cut by the plane 15—15 of Figure 14.
Figure 16 is a transverse vertical section cut by the plane 16—16 of Figure 2, Sheet 1, and showing the knockout operating cam.
Figure 17 is a fragmentary longitudinal vertical section showing more in detail the portion of the sectional view of Figure 9, (Sheet 4) in the vicinity of the coil chamber and the laminations to the right thereof, and showing the coil in position.
Figure 18 is a detail view representing the bottom portion of the apparatus illustrated in Figure 10, Sheet 4, as seen by looking upward, and illustrating in particular the levers for setting the lamination levelers of Figure 19.
Figure 19 is a transverse vertical section cut by the broken plane 19—19 of Figure 17 and illustrating an arrangement for leveling the laminations.
Figure 20 is a detail view of a resilient arrangement for preventing looseness of the laminations in the channel and representing to a larger scale a portion of the apparatus visible in Figure 6, Sheet 3. Sheet 6.

The reactor-assembling machine illustrated in the drawings comprises a horizontal plate 24 having a coil-receiving chamber 25 therein, left and right-hand lamination magazines 26 and 27, cam driven mechanism for manipulating the coil and laminations, and a driving motor 28 (Figure 2, Sheet 1 and Figure 6, Sheet 3). For gauging the requisite (height stack) of laminations from the bottoms of the stacks held in the magazines 26 and 27 and for moving these laminations toward the coil, a pair of cam-operated plungers 29 and 30 is provided, one of which is illustrated in detail in Figures 13 and 14. The plate 24 is provided with a longitudinal channel 31 in which the plungers 29 and 30 are adapted to slide and which extends in either direction from the coil chamber 25. To permit laminations engaged by the plungers to be pushed away from the bottom of the stack of laminations and to hold back the remaining laminations in the stack in spite of variations in the height of the group of laminations gauged by the plunger resulting from slight inaccuracies in thickness of the laminations, escape blocks 32 are provided. (Figures 17 and 19, Sheet 5, Figure 28, Sheet 3). For advancing the top and bottom pairs of laminations of the group of laminations engaged by either plunger 29 or 30, upper advancing fingers 33 and 34 and lower advancing fingers 35, as illustrated in further detail in Figure 13 and in Figure 22, are provided. The advancing fingers are mounted on the plungers 29 and 30 but are free to slide longitudinally with respect thereto. For holding back the center portion 22 of the group of laminations 21 while the advancing fingers 33, 34 and 35 are acting, hold-back blocks 36 are provided which are slidable in transverse channels 37. (Figure 6, Sheet 3, Figure 22, Sheet 6).

Figure 3:
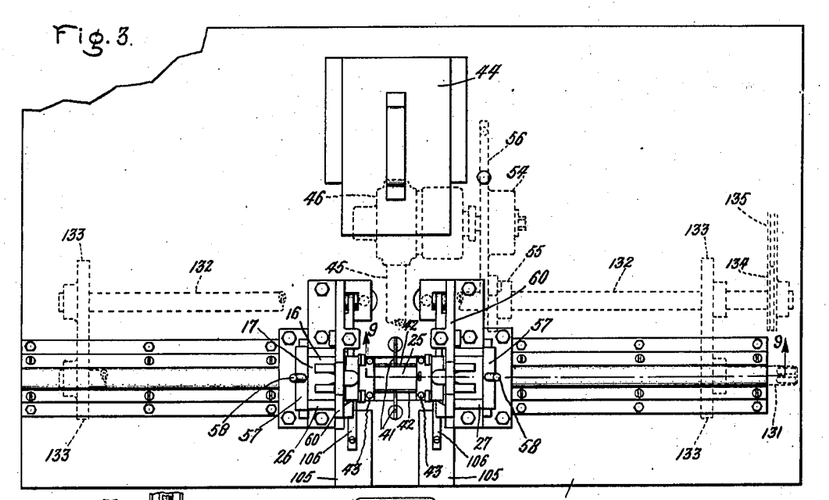
Figure 3, is a top view of the machine shown in Figure 2.
Figure 4:
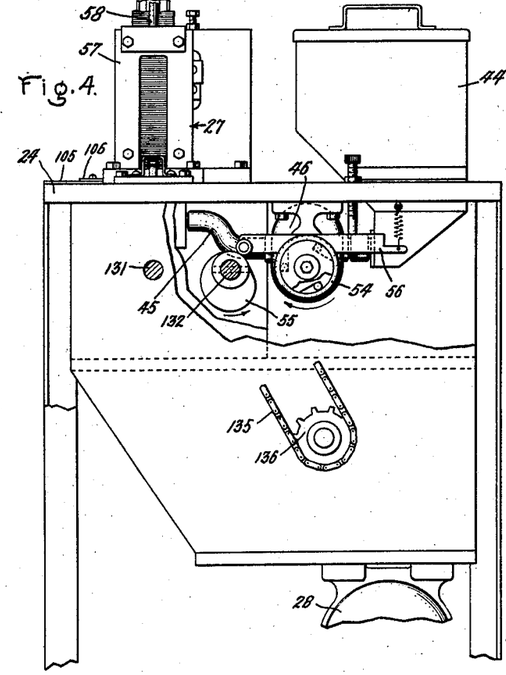
Figure 4 is an elevation of the machine as seen from the right-hand end.
Figure 26:
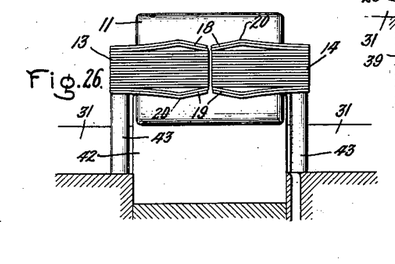

For crimping or bending the projecting tips of the legs of the top and bottom laminations, upper and lower sets of benders 38 and 39 are provided which are mounted to be vertically slidable in a manner which will be explained more in detail hereinafter. (Figure 17, Sheet 5; Figure 23, Sheet 6.) Hold-down dogs 40 serve to prevent upward tilting of the trailing ends of the laminations through the action of the benders 38 and 39. In order that movement of the laminations or the plungers 29 and 30 and the advancing fingers 33 to 35 may be stopped at the proper point, gap spacers 41, (Figure 3, Sheet 2 and Figures 24 and 25, Sheet 6) and stop plates 42 forming the sides of the coil chamber 25 (Figure 6, Sheet 3) are provided. For ejecting the completed electromagnetic induction apparatus after the laminations 13 and 14 have been inserted in the coil 11, upwardly movable knock-out pins 43 are provided. (Figure 6, Sheet 3, Figure 26, Sheet 6). In order that the requisite quantity of cement 23 may automatically be placed in the opening in the coil window before the laminations are inserted, a cement tank 44 (Figure 6) is provided together with a suitable duct 45 (Figure 17, Sheet 5); and a conventional type of gear pump indicated at 46 in Figure 4 may also be provided.

In order to produce advancing and retracting movement of the various movable elements in proper sequence a system of cams having driving and coasting sections is provided. The plungers 29 and 30, advancing fingers 33, 34 and 35 and the hold-back blocks 36 are driven by means of cylindrical cams 47 and 48, (Figure 2, Sheet 1) having circumferential grooves 49 for driving the plungers 29 and 30, additional circumferential grooves 50 for driving the advancing fingers 33, 34 and 35, and an end slot 51 for operating the hold-back blocks 36; the grooves 49 and 50 having helical portions to produce motion of the plungers in an axial direction with respect to the cylinders 47 and 48, and the slot 51 being designed to produce movement of the hold-back blocks 36 in a direction transverse to the axis of the cylinders 47 and 48. The benders 38 and 39 are driven by the cams 52 shown in Figure 10, Sheet 4 and the knockout pins 43 are driven by a cam 53. (Figure 16, Sheet 5.) The gear pump 46 is operated through an over-drive or one-way clutch 54 of conventional construction by a cam 55 designed to rock a spring-biased lever 56 attached to the driving side of the overdrive 54.

The lamination magazines 26 and 27 comprise a suitable vertical housing 57, vertical guide rods 58 and guide rails 59. The housing 57 has an internal cross-section sufficient to receive the laminations freely and the guide rails 59 are so attached to the inside walls 60 of the housing 57 as to occupy with a loose fit the spaces between the inner and outer legs of the E-shaped laminations. The flanged lower ends of the magazine housing 57 are secured to the top surface of the plate 24 and the lower ends 59' of the rails 59 extend only to a level slightly above the top surface of the plate 24. The interior of the housing 57 corresponds in width to the width of the channel 31 so that the laminations are free to drop from the magazine into the channel 31.

For closing the clearance space between the rails 59 and the plungers 29 and 30 the escape blocks 32 are so mounted upon either the rails or the plungers as to be vertically movable. As indicated in Figures 17 and 19, Sheet 5, the escape blocks 32 are secured to the lower ends of the guide rails 59 and have a slight oblique movement with respect thereto. The lower ends of the guide rails 59 have the mid portions 61 cut away to form recesses for receiving the escape blocks 32. The front and back edges of the rails 59 are also cut away. The escape blocks 32 have an end width corresponding to the width of the rails 59 and a mid portion of width corresponding with a loose fit to the width of the recesses 61. Pins 62 extend transversely through the escape blocks 32 and are secured thereto to cooperate with elongated sloping openings 63 in the rails 59. The escape blocks 32 are so dimensioned as to extend slightly below the lower ends of the rails 59 when the pins 62 are in the lower portion of the opening 63 and are no higher than the lower ends of the rails 59 when the pins 62 are in the upper ends of the opening 63. The slope of the opening 63 is such that the escape blocks 32 are caused to rise when moved toward the coil chamber. Thus the openings 63 serve as upward sloping tracks with the pins 62 serving as track engaging means. The distance from the bottom of the channel 31 to the lower end of the rails 59 is such in comparison with the height of the plungers 30, including the upper fingers 33 and 34, that the clearance between the top of the fingers 33 and 34 and the bottom of the rails 59 is greater than the thickness of the heaviest laminations to be handled by the machine, and the slope and length of the opening 63 is such that the possible variation in vertical position of the escape blocks 32 is slightly greater than the thickness of the heaviest laminations to be handled. For resiliently holding the escape block 32 downward against the group of laminations gauged, a compression spring 61' is provided in a cavity in the vertical wall 59. (Fig. 9 Sheet 4.)

In order to permit the machine to accommodate laminations which have a slight crosswise taper, which would cause the height of a group of laminations for insertion in the coil to be not the same at one side as the other, a pair of levelers 63' may be provided which have tips 64' extending through the bottom surface of the channel 31 under the lamination magazines to permit changing the level of the bottom surface of the yoke portion 17 of the stack of laminations. The vertical height of the levelers 63' is adjustable by means of arms 64, Figure 18, secured to the lower ends of the levelers 63' which are threaded as shown in Fig. 9 in order to permit leveling the top surface of the group of laminations or to divide unevenness between the top and bottom surfaces.

The plungers 29 and 30 are formed as pieces corresponding in width and depth to the channels 31, but having the lower surface cut out for the lower advancing fingers 35 and having portions of the top cut out for the upper advancing fingers 33 and 34. Secured to the mid portion of each of the pieces forming the plungers 29 and 30 is a screw 65 carrying at lower end a cam follower 66 adapted to cooperate with the groove 49 in the associated cams 47 or 48. Slidably secured to each plunger 29 or 30 is a split piece 67 which fits under the plunger having secured thereto a cam follower 68 adapted to cooperate with the groove 50 in the cylindrical cams 47 or 48. The piece 67 has a slot 69 fitting around the portion of the plunger 30 connected to the cam follower 66 so that the lower advancing finger 35 secured to the piece 67 is longitudinally movable with the piece 67 and the cam follower 68. The upper advancing fingers are divided into the two portions 33 and 34 and are hinged to the piece 67 by means of joints 70. Compression springs 71 are mounted in sockets provided therefor in the plunger 30 to hold the upper advancing fingers 33 and 34 resiliently upward against the laminations remaining in the lamination magazines after the group gauged has been partially advanced. The advancing fingers 33, 34 and 35 fit in suitable sufficiently deep recesses in the plunger 30. The guide rail 59 is so mounted that its edge 59' at the lower end clears the top edge 72 of the plunger 30 sufficiently to avoid jamming of laminations which might otherwise be caught between the edges of both members, since the laminations will seldom be of such thickness that the height of the plunger 30 exactly equals the height of an even number of laminations. The depth of the recesses for the advancing fingers 33 and 34 is great enough to permit them to be pushed below the top edge 72 of the plunger 30 against the springs 71 by rollers 77, described more in detail hereinafter. The fingers 33 and 34, however, are so constructed with shoulders 72a between the leading higher portions 72b and the remaining lower portions 72c thereof that the portions 72c clear the rollers 77. The pieces are so shaped that the tips of the advancing fingers 33, 34 and 35 can be moved toward the coil chamber in advance of the end of the plunger 30, but the end of the plunger 30 can move relatively little in advance of the front ends of the advancing fingers 33, 34 and 35.

Figures 9, 10, 11, 12:
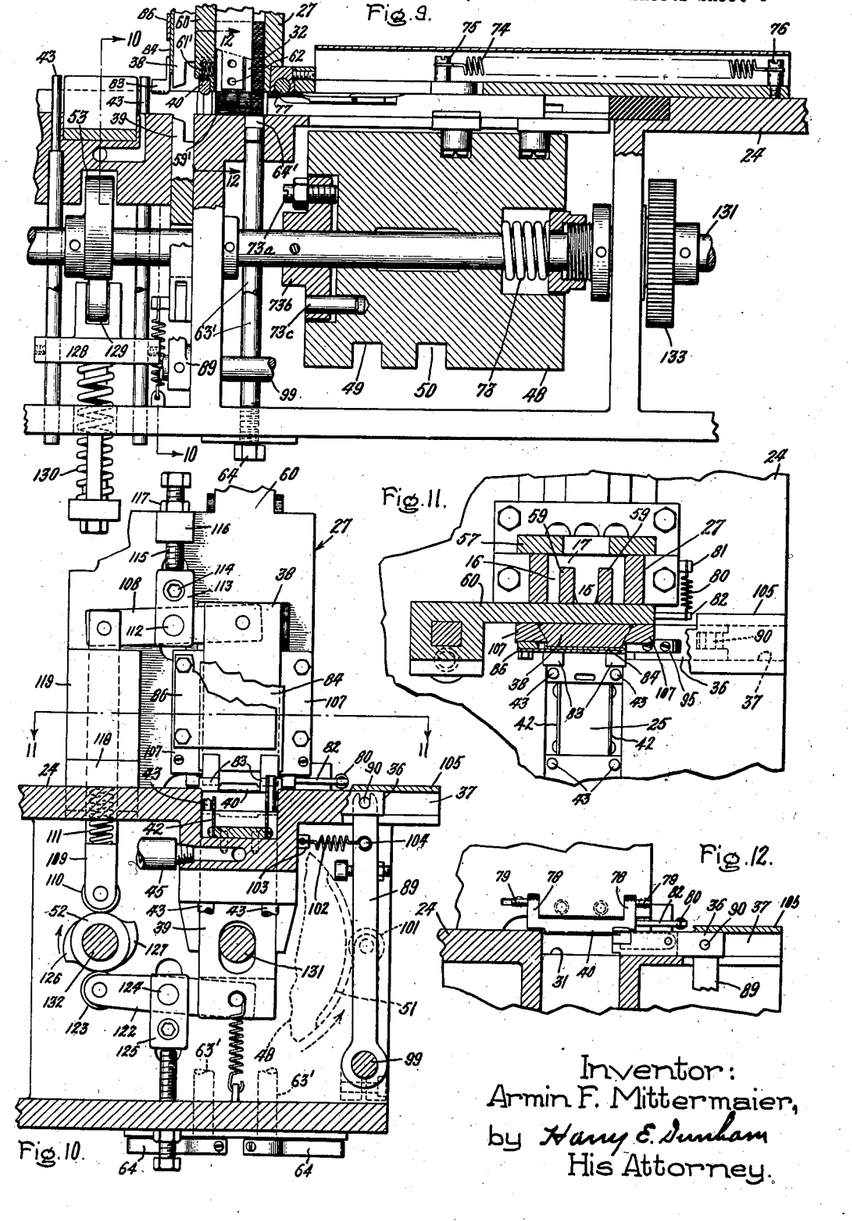
Figure 9, is a fragmentary vertical longitudinal section of the machine cut by the plane 9—9 of Figure 3 (Sheet 2) as seen by looking in the direction of the arrows.
Figure 10 is a transverse vertical section cut by the broken plane 10—10 of Figure 9, as seen by looking toward the right in the direction of the arrows.
Figure 11 is a horizontal section of the portion of the apparatus cut by the plane 11—11 of Figure 10 as observed by looking downward.
Figure 12 is a fragmentary transverse vertical section cut by the plane 12—12 of Figure 9 (Sheet 4) with the portion of the apparatus at the bottom end of the lamination magazine shown in detail. Sheet 5.

In order that the laminations may be driven closely against the gap spacers, the cam cylinders 47 and 48 are mounted to have a slight axial movement along the shaft 131 and a relatively stiff compression spring 73 is provided to take up any slack, the amount of which is adjustable by means of a bolt 73a threaded into a collar 73b secured to the shaft 131 and carrying a pin 73c engaging the cam cylinder 48, which is axially slidable with respect thereto (Figure 9, Sheet 4). For resiliently biasing the plungers 29 and 30 and the advancing fingers away from the coil chamber 25, tension springs 74 are provided secured to posts 75 on the pieces 67 and stationary posts 76. In order to hold down the top advancing fingers 33 and 34 and the plunger 30, rollers 77 are rotatably mounted on the under side of the lower flange of the lamination magazine. (Figure 17, Sheet 5 and Figure 7, Sheet 3.)

The hold-down dogs 40 are U-shaped with the yoke of the U at the lower end for bearing against the groups of laminations pushed out by the plungers and with upwardly extending arms 78. They are also mounted upon the magazines 26 and 27, being pivoted at the upper ends of the arms 78 on pins 79. For resiliently biasing the hold-down dogs downward and in a direction away from the coil chamber, springs 80 are provided secured at one end to stationary pins 81 and at the other end to long transversely extending pins 82 secured to the yoke portions of the hold-down dogs 40. (Figure 6, Sheet 3.) In order to hold down compactly the groups of laminations moved by the plungers and the advancing fingers after the benders 38 and 39 have acted, presser feet 83 may be provided which are secured to vertically slidable plates 84 resiliently pressed downward by compression springs 85 and held in place by guide plates 86. To insure that the laminations will drop vertically into the channel 31 when the plungers are retracted instead of riffling down slantwise to form of sloping stack spring-pressed rollers 87 extending slightly into the channel 31 may be provided, one of which rollers is visible in Figure 6, Sheet 3, and is shown at larger scale in Figure 20, Sheet 5.

The right-hand hold-back block 36 is shown more in detail in Figure 8. It will be seen that the end of the block 36 at the front of the machine is bifurcated to receive a driving lever 89 (Figure 10, Sheet 4) and has an opening 88 for receiving a wrist pin 90. The other end of the hold-back block 36 is also bifurcated to receive a part 91 mounted to move about the pivot pin 92 fitting openings 92'. The ends of both the block 36 and the part 91 away from the front of the machine are notched back to form projecting lugs 93 and 94, respectively, adapted to engage the center laminations 22 of the group of laminations 21 being moved by the plunger 30. (Figure 23, Sheet 6.) Sufficient space is provided between the lower edge of the lugs 93 and the bottom of the block 36 to permit the passage of a certain number of laminations 19, preferably a pair of laminations, which are to be crimped at the bottom of the group of laminations 21 which is gauged to form the core. Similarly the distance between the top of the lug 94 and the top of the part 91 is made such as to admit a predetermined number, preferably a pair of laminations 18.

For properly locating the movable end of the part 91 with respect to the top of the group of laminations being pushed into the coil, a spring flange 95 is secured to the top of the part 91. The flange 95 has a curled lip 96 which causes the flange 95 to ride along the top surface of the group of laminations and to keep the top of the part 91 aligned with the top of the group of laminations being moved by the plunger 30. The top inner corner 97 of the hold-back block 36 is cut out a little deeper than the vertical depth of the part 91 in order to permit the part 91 to accommodate itself to groups of laminations which may be a little less than standard in height and of course, the pivotal mounting of the part 91 also permits it to accommodate itself to groups of laminations slightly higher than usual.

The lever 89 for driving the hold-back block 36 is pivotally mounted at its lower end, being secured to a rotatable shaft 99. The shaft 99 carries also an upwardly extending lever 100 having rotatably mounted at its upper end a cam follower 101 adapted to cooperate with the end slot 51 in the cam cylinder 48. For holding the cam follower 101 against the cam cylinder 48, a spring 102 may be provided and is connected at one end to a stationary eyelet 103 and at the other end to a pin 104 on the lever 89. (Figure 10, Sheet 4.) The slots or channels 37 for receiving the hold-back blocks 36 may be covered by plates 105 which, in turn, have spring strips 106 secured thereto and extending toward the ends of the plates 105 away from the front of the machine to hold the parts 91 down against the blocks 36. (Figure 6, Sheet 3.)

The vertically movable benders 38 and 39 are provided with linkage which permits the corresponding upper and lower benders to be operated from the same cam 52. (Figure 10, Sheet 4.) The upper bender 38 is slidably mounted in a channel of dovetailed cross-section formed by two undercut beveled strips 107 bolted to the plate 60 of the magazine housing. (Figure 6, Sheet 3, Figure 10, Sheet 4 and Figure 17, Sheet 5.) A walking beam 108 is provided which is connected at one end to the upper end of the bender 38 and at the other end to a vertically slidable rod 109, the lower end of which carries a cam follower 110. For holding the rod 109 with the cam follower 110 down against the cam 52, a compression spring 111 is provided which bears against the lower end 118 of the member 119 which houses the vertically sliding rod 109 and may be cast integral with the plate 60. (Figure 7, Sheet 3.) The walking beam 108 is pivoted at its center about a pin 112 which is adjustable in height. The pin 112 is secured in a bifurcated block 113 which is secured vertically slidable by means of a screw 114 engaging a slot in the plate 60. However, for providing sufficient strength to resist the force exerted on the walking beam 108, a bolt 115 is also provided which bears against the upper end of the block 113 and is threaded into a lug 116 and secured in position by a lock nut 117. As shown in Figure 7, the lower end of the bender 38 is not even across its width and extends lower at the sides than in the middle in order that the outside legs of the E-shaped laminations may be bent more than the inside arms. The outer portions 120 of the lower end of the bender 38 extend somewhat lower than the middle portion 121, but both portions 120 and 121 are beveled to correspond to the amount of bending desired, as illustrated in Figure 23, Sheet 6. Openings 121' are provided in the plate 24 of suitable shape to receive the lower projecting portions of the housing 119, the rod 109 and the spring 111.

The lower benders 39 are mounted in a somewhat similar manner, each being pivoted at the lower end to one end of a walking beam 122 which carries a cam follower 123 at its other end, also cooperating with the cam 52. The lower walking beam 122 is centrally pivoted on a pin 124 and the block 125 which is also adjustable in height. The cam 52 carries two cam portions 126 and 127 which are axially offset, the cam followers 121 and 123 also being correspondingly offset so that the cam follower 110 rides only on the cam portion 126 and cam follower 123 rides only on the cam portion 127 and the benders are operated only once for each revolution of the cam 52.

The knock-out pins 43 are secured to a cross piece 128 (Figure 16, Sheet 5) which carries a cam follower 129 cooperating with the cam 53, the spring 130 being provided for holding the cam follower 129 against the cam surface.

As shown in Figure 2, Sheet 1 and Figure 9, Sheet 4, the cam cylinders 47 and 48 and the knockout operating cam 53 are mounted on a common shaft 131. The bender operating cams 52 and the pump-operating overdrive 55 are mounted on a second common shaft 132, shown in Figure 3, Sheet 2. The shafts 131 and 132 are mechanically connected, for example, by means of intermeshing gears 133 at each end of each shaft and of the same size so that the shafts 131 and 132 rotate at the same speed. The shaft 132 carries a sprocket wheel 134 meshed with a chain 135 driven from a second sprocket wheel 136 rotated by the motor 28 through a gear box 137 and connecting belt and pulleys 138.

Figure 27:
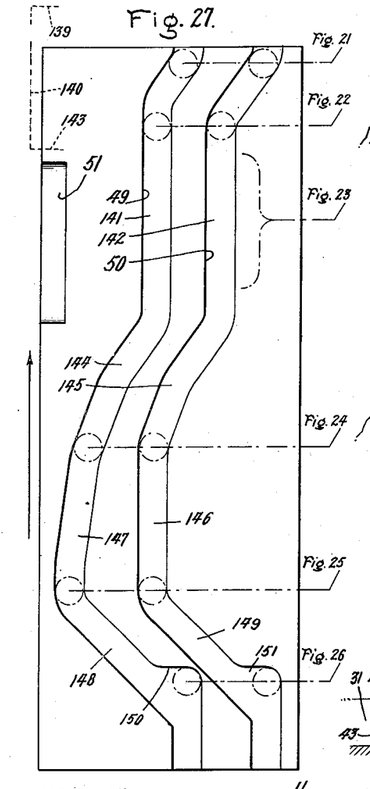
Figure 27 is a developed view of the surface of the cam for operating the plungers, advancing fingers and hold-back blocks showing the driving and coasting sections of the cam and having indicated thereon by broken lines the relative positions of the cam followers of the plungers and fingers for each of the stages in the operation illustrated in Figures 21 to 26, inclusive.

The reactor-assembling operation takes place as follows: An ample supply of laminations is dropped into the magazines 26 and 27 over the guide rails 59 between the guide rods 58 and the plate 60. The magazines having been filled, the operator places a form-wound coil 11 in the coil chamber 25, as shown in Figure 17, Sheet 5 and Figure 21, Sheet 6. The motor 28 is then started by closing the electric switch, not shown, and the plungers 29 and 30 come against the laminations at the bottom end of the stack. (For convenience the operation at only one side of the machine will be considered since the machine is symmetrical). This step is shown in Figure 21 and corresponds to the position of the cam followers 66 and 68 in the cylinder cam grooves 49 and 50, identified by the dashed line in Figure 27 bearing the caption "Figure 21." The plunger gauges a group of laminations of the proper height, determined by the height of the plunger and starts to push along this group of laminations. The further rotation of the cylinder cam 48 acting through the cam followers 66 and 68 advances both the plunger 30 and the advancing fingers 33, 34 and 35. However, owing to the fact that the groove 50 has a greater lead than the groove 49 in the portion between the dashed lines marked Figure 21 and Figure 22 in Figure 27, the advancing fingers 33, 34 and 35 are moved further than the plunger 30 and take the position shown in Figure 22 which causes the top and bottom pairs of laminations 18 and 19 to project beyond the remaining laminations 22. But before the advancing fingers 33 and 34 have begun to precede the plunger 30 the shoulders 72a have cleared the rollers 77 (Figs. 13 and 17, Sheet 5) allowing the springs 71 to force the fingers up against the bottom of the lamination remaining in the stack, thus definitely assumes that the fingers will pick off the top two laminations in the group gauged and not the second and third. The top and bottom laminations 18 and 19 slip beyond the lugs 93 and 94 of the hold-back blocks 36, which however, hold back the remaining laminations 22. The hold-back block 36 has been interposed in the path of the laminations for the reason that the groove 51 in the cylinder cam 48 cooperates with a cam follower displaced 90° ahead of the cam followers 66 and 68, and therefore, the effect is as if the hold-back block operating cam follower 101 dropped in at the point 139 of the dotted rectangle 140 representing the equivalent position of the groove 51 with respect to the sequence of events marked off along the development of the cam surface shown in Figure 27.

It will be seen that immediately after the cam followers 66 and 68 have reached the point marked Figure 22 and begin to enter the coasting portions 141 and 142 of the cam grooves 49 and 50, the effective end point 143 of the dotted rectangle 140 representing hold-back block-operating groove 51 is reached so that the hold-back block 36 is drawn back, leaving the benders 38 and 39 free to act. The angular positions of the bender operating cams 52 are such on the shaft that the benders 38 and 39 come together while the plunger and advancing finger operating cam followers 66 and 68 are in the coasting portions 141 and 142 of their cam grooves causing the laminations to be held stationary. The benders 38 and 39 return to their coasting position immediately after bending the arms of the laminations by reason of the shapes of the bender-operating cam portions 126 and 127. During this same period, or if desired and the apparatus is so set, at any time prior to the final advancement of the advancing fingers, the pump operating cam 55 gives an impulse to the operating arm 56 rotating the shaft through the overdrive 54 sufficiently to permit the expulsion of the proper amount of cement 23 from the end of the duct 45. Since the end of the duct 45 as shown in Figure 23, is in front of the end of the coil window a globule of cement 23 can flow into the coil window. The plunger and advancing finger cam followers 66 and 68 then enter the helical portions 144 and 145 of the grooves 49 and 50 causing the top and bottom punchings 18 and 19 and the intermediate punchings 22 to be moved inward as a unit into the coil window to take the position shown in Figure 24. Thereupon the advancing-finger-operating cam follower 68 enters a coasting portion 146 of the cylinder cam groove 50, whereas the portion 147 of the groove 49 continues to be helical causing the cam follower 66 to continue moving, pushing the intermediate laminations 22 on against the cap spacer 41 as a result of the continued movement of the plunger 30. The ends of the stop plates 42 engaging the inner edges of the yoke portions 17 of the laminations prevent the advanced laminations from moving too far or being curled by striking the gap spacers 41 in case the moving intermediate laminations 22 should tend to grab the advanced laminations. The top, bottom and intermediate laminations are then in alignment, as shown in Figure 25. Both cam followers 66 and 68 enter the reverse helical portions 148 and 149 of the cam grooves 49 and 50, causing the plunger 30 and the advancing fingers 33, 34 and 35 to be drawn back quickly. When the cam followers reach the points 150 and 151 in the grooves 49 and 50 they drop back suddenly to their original position under the action of the spring 74, and in this way permit the next group of laminations to be dropped in place, ready for the next cycle of operation without tilting. Thereupon the cam 53 leaves the coasting portion of its surface and causes the knockout pins 43 to rise abutting the laminations and lifting the completed reactor out of the coil chamber 25. The operator then removes the completed reactor and inserts another form-wound coil in the coil chamber to repeat the cycle of operation, and assemble another reactor.

It will be understood that the depth of the channel 31 and the height of the plunger 30 are made to correspond to the normal height of the group of laminations which is to be inserted into the coil window. However, it is manifest that slight variations in the actual height of the group of laminations will be inevitable in commercial laminations owing to the variations in thickness and lack of perfect flatness of punchings obtained. If the usual requisite number of laminations, 20 for example, results in the height of the group of laminations slightly greater than the height of the top surface of the plunger 30, there will be a tendency for the plunger 30 to engage only the lower part of the top lamination of the selected group, and if the escape blocks 32 were not provided, the top lamination would either catch at the lower end of the magazine guide rails 59 and jam the machine, or would cause partial sliding of additional laminations above the intended group, depending on whether the guide rails 59 are exactly aligned with the top surface of the fingers 33 and 34, or clearance space is provided. However, with the escape blocks 32 in use they prevent the 21st lamination, assuming 20 laminations are to be counted, from being pushed forward by friction when the lower laminations are moved by the plunger 30. The escape blocks 32 would also tend to hold back the top lamination of the intended group until the escape blocks had arisen sufficiently along the sloping opening 63 to permit the top lamination to be cleared. There would, however, be insufficient pressure due to friction on any remaining lamination above the last one selected to cause the escape blocks 32 to be lifted any further, and accordingly 20 laminations would be pushed on to the position of the coil chamber and go through the normal continuity of operation. If the laminations should depart materially from standard thickness the escape blocks 32 would enable the plungers to advance the number of laminations producing a group of the height of the plunger or a fraction of a lamination thereover and the operation would proceed in the manner already described.

If it is desired to fix the reactance of the reactor with a high degree of accuracy, the air gap 152 may be left slightly higher than the anticipated value by using a slightly thicker gap spacer 41, and the laminations may then be moved closer by means of a device or other suitable fixture having a fine screw to permit gradual shortening of the air gap until the proper value of reactance is obtained. If this procedure is carried out it must be done sufficiently soon after the reactor is removed from the assembling machine before the cement filling the window in the space between the laminations in the coil window has had an opportunity to harden. If the reactance is to be precisely adjusted in the manner just suggested, the coil may be connected in an electrical circuit for measuring reactance while the air gap is being given its final adjustment. In order to set the cement the reactor may be given a heat treatment, and to improve the insulating properties of the coil the reactors may thereafter be treated with rosin and finally impregnated with a suitable insulating compound, or the cement may be allowed to set while the coil is being treated.

My invention is not limited to any particular size of stationary induction apparatus. However, I have obtained satisfactory results pertaining to reactors for use with fluorescent lamps. In this case the core consists of about 20 laminations 1" x 1½", forming a ½" stack, with the center laminations about ½" wide and with the outer laminations about ¼" wide. The gap is made about .012 of an inch to produce a reactor of .71 henry for 15 watt 110 volt lamps and about .015 of an inch to produce a reactor of about .61 henry for 20 watt 110 volt lamps. A satisfactory composition of cement was found to be a mixture of 2 parts Portland cement by weight and 1 part of Bakelite varnish, designed by the Bakelite Company as BV-6509. The cement was found to penetrate well and there was found to be no need for wedging or clamping of the laminations to obtain freedom from noise or vibration.

The escape block spring 61' is made stiff enough to hold the escape block 32 and the laminations engaged by it against the frictional force between the lowermost lamination engaged by the gage block 32 and the laminations engaged by the plunger 30 while the plunger is moving forward. However, if the spring is made stiff enough to be effective for all conditions, and if the clearance between the lower edge 162 of the escape block 32 and the top edge 72 of the plunger 30 is made great enough when the escape block 32 has been moved forward and upward its full limit to take care of possible wide variations in thickness of laminations to be handled, there is a possibility that at times an extra lamination may be advanced between the bottom of the escape block and the top of the plunger in such a way that the extra lamination is free to float in an indefinite position. This might occur, for example, if the uppermost lamination engaged by the plunger 30 were so high that only a minute corner thereof engaged the plunger 30, leaving the laminations liable to slip over the edge 72 of the plunger 30. If such an extra lamination should be advanced it would be necessary to extract it manually.

Figure 29:
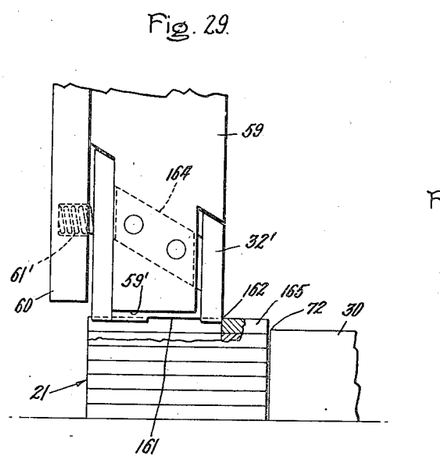
Figs. 29 and 30 illustrate a modified form of escape block and Fig. 31 illustrates a modified form of hold-back block for use with the apparatus illustrated in the other figures.
Figure 30:
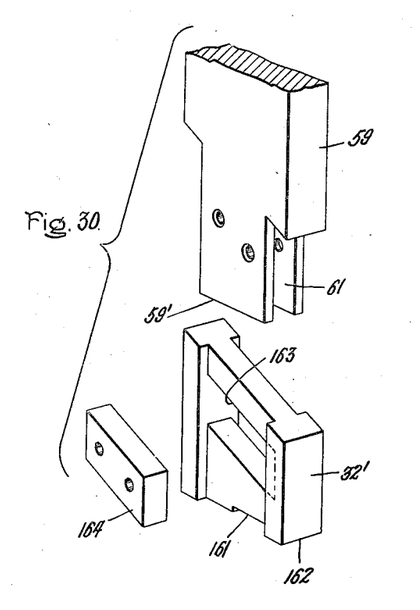

In cases where such difficulties are liable to occur the difficulty may be eliminated by utilizing a modified form of escape block 32' illustrated in Figs. 29 and 30 (Sheet 7). The modified form of escape block 32' may be similar in every respect to the escape block 32 previously described with the exception that it has a recess or trap 161 along the lower side. The trap 161 extends from a point near the front edge 162 of the escape block 32' to a point about midway the length of the lower side of the escape block 32'. The length of the trap 161 is made somewhat greater than the width of the yoke portion 17 of the E-shaped laminations. If desired, the durability of the escape block may also be increased by avoiding the use of the pin 62 and elongated openings 63, and instead providing a sloping recess 163 cooperating with, and making a slide fit with, a diagonal block 164 riveted to the inner surfaces of the recess 61 in the bifurcated rail 59.

Figure 31:
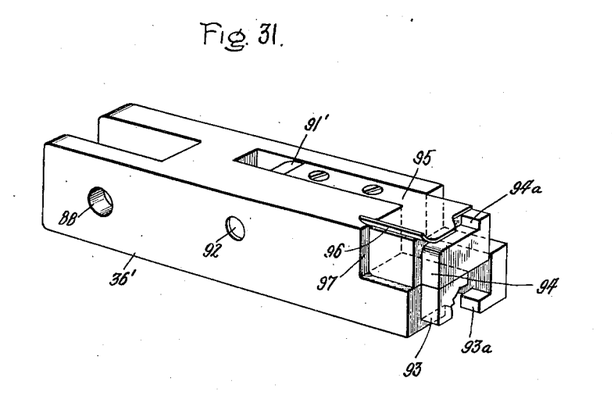

If the modified form of escape block 32' is employed, the stack guiding rollers 87 are omitted and a modified form of hold-back block 36' illustrated in Fig. 31 is employed. The hold-back block 36' and the movable part 91' thereof differ from the corresponding parts 36 and 91, previously described, by the addition of stops 93a and 94a. The length of the slot 51 in the cylindrical cam 48 is also increased sufficiently so that the hold-back block 36' reenters the channel 30 before the plunger-operating cam followers 66 and 68 snap back into the cam-groove recesses 150 and 151 to permit the next group of laminations to drop.

When the modified escape block 32' and the modified hold-back block 36' are employed the operation is the same as previously described with certain exceptions indicated below. Referring to Fig. 29, the lamination 165 has its heel engaged by the plunger 30 and also engages the front edge 162 of the escape block 32'. The forward movement of the plunger 30 against the lamination 165 causes the escape block 32' to move forward also against the pressure of the spring 61'. This causes the escape block 32' to rise, owing to its sloping groove 163, and thus to clear the lamination 165. If the lamination 165 should slip off the tip 72 of the plunger 30 after it has forced the escape block 32' upward far enough to be cleared by the tip 162 of the escape block, the lamination 165 would nevertheless be caught in the trap 161 and held there until the remaining group of laminations 21 engaged by the plunger 30 had been inserted in the coil window 12 and the plunger 30 had returned to its initial position allowing the extra lamination 165 to drop. Although the lamination 165 would be ahead of the rest of the stack of laminations, and because the roller 87 has been removed, it would be possible for the rest of the stack to scatter forward a little, between the plunger 30 and the hold-back block 36, so the whole stack to be gauged would be out of line; however, as the plunger 30 moved forward, the inner stack 22 as in Fig. 22 page 6 would be brought into its correct position between the face 93 and 94 of Fig. 31 and the face of plunger 30, so that the inner stack would now be in a straight line; and as the upper and lower selector fingers 33, 34 and 35 have moved forward with the plunger 30, and as they advance ahead of the plunger 30 for the bending position, the two outer pairs of laminations which include the extra lamination 165 which was ahead of the rest of the stack are now brought into their correct position as in Fig. 22 page 6, between the ends of the selector fingers 33, 34 and 35 and the face 93a and 94a of the hold-back block.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. The method of assembling E-shaped core laminations with conductive winding structures or coils for electromagnetic induction apparatus which comprises the steps of selecting a group of such laminations forming a stack of sufficient thickness to form a core, placing laminations at the top and bottom of the group with the legs of the E projecting beyond the remainder of the group of laminations and retaining remaining laminations with their outlines in registry, bending the projecting portions of the middle legs of the laminations at the top and bottom of the group toward each other, also bending the projecting portions of the outer legs of the laminations at the top and bottom of the group toward each other but bending them farther than the said middle legs, inserting the middle leg of the group of laminations into the coil window with the laminations at the top and bottom of the group in advance and thereafter further inserting the remaining laminations to bring all the laminations in registry.

2. The method of assembling E-shaped core laminations with conductive winding structures or coils for electromagnetic induction apparatus which comprises the steps of selecting a group of such laminations forming a stack of sufficient thickness to form a core, placing laminations at the top and bottom of the group with the legs of the E projecting beyond the remainder of the group of laminations while retaining the remaining laminations with their outlines in registry, bending the projecting portions of the middle legs of the laminations at the top and bottom of the group towards each other, inserting the middle leg of the group of laminations into the coil window with the laminations at the top and bottim of the group in advance, and thereafter farther inserting laminations to bring all the laminations in registry.

3. The method of assembling E-shaped core laminations with conductive winding structures or coils for electromagnetic induction apparatus which comprises the steps of selecting a pair of groups of such laminations, each group forming a stack of sufficient thickness to form a core, placing laminations at the stop and bottom of each group with the legs of the E projecting beyond the remainder of the group of laminations and retaining the remaining laminations with their outlines in registry in each group, bending the projecting portions of the middle legs of the laminations at the top and bottom of the group towards each other in each group, inserting the middle legs of the groups of laminations into the coil window from opposite directions with the laminations at the tops and bottoms of the groups in advance, stopping the laminations at a fixed position with respect to each other, and thereafter farther inserting the remaining laminations to bring all of the laminations of a group in registry, but prior to inserting any of said laminations placing cement in the coil window of a sufficient quantity to fill the space within the coil window not finally occupied by core material.

4. The method of assembling E-shaped core laminations with conductive winding structures or coils for electromagnetic induction apparatus which comprises the steps of selecting a group of such laminations forming a stack of sufficient thickness to form a core, placing laminations at the top and bottom of the group with the legs of the E projecting beyond the remainder of the group of laminations and the remaining laminations having their outline in registry, bending projecting portions of the legs of the laminations at the top and bottom of the group toward each other, inserting the middle leg of the group of laminations into the coil window with the laminations at the top and bottom of the group in advance, and thereafter further inserting the remaining laminations to bring all of the laminations in registry.

5. A machine for assembling E-shaped core laminations with conductive-winding structures or coils for electromagnetic induction apparatus, which machine comprises a pair of magazines for vertical stacks of E-shaped laminations, spaced apart and arranged for holding the open or unjoined ends of the legs of the E's of one stack facing toward those of the other, a support for a coil between the bottom ends of the magazines, a gap spacer beside the coil support substantially in a plane perpendicularly bisecting the coil axis, a pair of plungers for pushing groups of laminations at the bottoms of said magazines towards each other toward the location of the coil support, advancing fingers included in said plungers for advancing the top and bottom laminations of the groups of laminations which are in operative relation to the plungers, said plungers being horizontally movable in the same line, a pair of hold-back blocks horizontally movable in parallel lines perpendicular to the line of motion of the plungers, the range of movement of said hold-back blocks being such that their tips may enter the line of motion of said plungers, the tips being arranged to block the center portions of the groups of laminations which are in operative relationship to the plungers, but to permit the advancement of the top and bottom laminations of the groups, perpendicularly movable benders for bending the projecting legs of the advanced laminations together, downwardly resiliently biased hold-down dogs beside the magazines for preventing tilting of the top laminations being bent, a cement reservoir, a pump and tubing associated therewith for conveying cement from said reservoir to the location of the opening in a coil held in said coil support, a coil knockout member movable from below said coil support and driving mechanism for said plungers, advancing fingers, hold-back blocks, benders, pump and coil knockout, said driving mechanism including connecting devices interposed before said driven elements having coasting and driving sections for making the operative driving connections successively advancing and retracting the plungers, fingers, hold-back blocks and benders in suitable sequence, the connecting device for the knockout mechanism being normally in the coasting section, the remaining connecting devices being arranged with driving sections in order, as follows: an advance driving section for the hold-back blocks, short advance driving sections for the plunger and the advancing fingers, the finger-driving section being longer than the plunger-driving section, retracting sections for the hold-back blocks, an advance driving section and then a retracting section for the benders, simultaneous advance driving sections for the plungers and advancing fingers, a further advance driving section for the plungers, full retracting sections for both plungers and fingers, and an advance driving section for the knockout member, the driving section for the cement pump preceding the last-mentioned driving section for the plungers.

6. In apparatus for assembling stacked laminations with conductive-winding structures or coils, a magazine for a vertical stack of laminations, a coil support thereadjacent, a reciprocating plunger for pushing a group of laminations from the bottom of said stack to the position of the coil support, and an escape block for preventing motion of laminations above the group which is in operative relationship with the plunger, said escape block being yieldably mounted with an oblique upward direction of yield, whereby lack of exact engagement of a predetermined number of laminations at the bottom of the stack with the plunger results in upward motion of the escape block sufficient to permit the uppermost lamination caught by the plunger to be freed by the escape block.

7. In apparatus for assembling stacked laminations with conductive winding structures or coils, a magazine for a vertical stack of laminations, a coil support thereadjacent, a reciprocating plunger for pushing a group of laminations from the bottom of said stack to the position of the coil support, a vertical guide rail in the said magazine for preventing motion of laminations intended to remain in the magazine while the bottom group of laminations is being pushed by said plunger, said guide rail being mounted with clearance between its lowermost edge and the top edge of the said plunger, and release means resiliently mounted, movable relative to one of said last two mentioned members for normally closing the clearance space intervening between the top edge of the reciprocating plunger and the bottom edge of said guide rail, and releasing any lamination partially within said clearance space and caught between the edges of said release means and one of said last two mentioned members, whereby lack of exact engagement of a predetermined number of laminations at the bottom of the stack with the plunger results in sufficient vertical motion of the release means to permit the last mentioned caught lamination to be freed.

8. In a machine for assembling E-shaped core laminations with conductive winding structures or coils for electromagnetic induction apparatus, the combination of a magazine for a vertical stack of laminations, a coil support thereadjacent, a reciprocating plunger for pushing a group of laminations from the bottom of said stack past a predetermined location and to the position of the coil support, a transversely reciprocating hold-back block projectible into the path of the moving laminations at said location for stopping motion of the laminations in the middle of the group, reciprocating advancing fingers for continuing the advance of laminations at the top and bottom of the group while middle laminations are so held, until said continued advancing laminations project a predetermined distance beyond the remaining laminations of their group, and means for driving the plunger, advancing fingers and hold-back block to carry out the movements aforesaid and likewise synchronized to withdraw the hold-back block after the advancing fingers have traveled said predetermined amount to cause the fingers and plunger to move together to insert the group with its projecting laminations into the coil and thereafter to cause the plunger to reach the position of the advancing fingers to bring all of the laminations selected by the plunger and advancing fingers in alignment.

9. In a machine for assembling E-shaped core laminations with conductive winding structures or coils for electromagnetic induction apparatus, a magazine for laminations, means for selecting a sufficient number of laminations in a stack from the magazine to form a magnetic core for a coil, means for advancing the laminations at the top and bottom of the stack with the legs of the E extending beyond the legs of the E of the remaining laminations while retaining the latter in registry, means for bending the projecting legs of the laminations at the top and bottom of the stack toward each other, means for inserting the center legs of the E in the coil, and means for bringing all the laminations of the stack in registry.

10. In a machine for assembling laminations with conductive winding structures or coils for electromagnetic induction apparatus, the combination of a magazine for a vertical stack of laminations, a reciprocating plunger for pushing a group of laminations from the bottom of said stack, a reciprocating advancing finger for advancing laminations from said group for facilitating assembly of a group of laminations with a coil, and driving means for said plunger and said advancing finger, said plunger having top and bottom surfaces, and said advancing finger being slidable substantially along one of said surfaces, said driving means including mechanism for accelerating the advancing finger after the said plunger is set in motion.

11. In a machine for assembling laminations with conductive structures or coils for electromagnetic induction apparatus, a magazine for laminations, means for selecting a sufficient number of laminations in a stack from the magazine to form a magnetic core for a coil, means for advancing the laminations at the top and bottom of the core of selected laminations to such an extent that their ends extend beyond the remaining laminations to present projecting portions, and vertically moving bending means for bending the projecting portions toward each other to form a wedge-like assembly of laminations which facilitates insertion thereof in a coil.

12. In a machine for assembling laminations with conductive winding structures or coils for electromagnetic induction apparatus, the combination of a magazine for a vertical stack of laminations, means for pushing a group of laminations from the bottom of the stack, said means including projecting fingers for pushing the top and bottom laminations of the group farther than the rest for facilitating assembly of the group of laminations with a coil, a hold-back block for stopping motion of the laminations in the middle of the group to prevent frictional drag thereon by the top and bottom laminations and thus to permit the top and bottom laminations to remain in advance, and driving mechanism synchronized with said pushing means for interposing said hold-back block in the path of the group of laminations engaged by said pushing means and thereafter withdrawing the hold-back block to permit continued movement of the group of laminations by said pushing means.

13. A machine for assembling core laminations with conductive-winding structures or coils for electromagnetic induction apparatus, which machine comprises a magazine for a vertical stack of laminations, a support for a coil beside the bottom end of the magazine, a plunger for pushing a group of laminations at the bottom of said magazine toward the location of the coil support, said plunger having top and bottom surfaces, an advancing finger included in said plunger and slidable substantially along one of said surfaces thereof for advancing a lamination at one end of the group which is in operative relation to the plunger, said plunger being horizontally movable in a line toward the location of said coil support, a hold-back block horizontally movable perpendicular to the line of motion of the plunger, the range of movement of said hold-back block being such that its tip may enter the line of motion of said plunger, the tip being arranged to block the center portion of the group of laminations which is in operative relationship to the plunger but to permit the advancement of top or bottom laminations of the group, a perpendicularly movable bender for bending the projecting portion of an advanced lamination toward the other end of the group of laminations, and driving mechanism for said plunger, advancing finger, hold-back block and bender, said driving mechanism including connecting devices interposed before said driven elements having coasting and driving sections for making the operative driving connections successively, advancing and retracting the plunger, finger, hold-back block and bender in suitable sequence, the connecting device being arranged with driving sections in order, as follows: an advance driving section for the hold-back block, a short advance driving section for the plunger and the advancing finger, the finger-driving section being longer than the plunger driving section, a retracting section for the hold-back block, an advance driving and retracting section for the bender, simultaneous advance driving sections for the plunger and the advancing finger, a further advance driving section for the plunger, and full retracting sections for both the plunger and the finger.

14. A machine for assembling core laminations with conductive winding structures or coils for electromagnetic induction apparatus, which machine comprises a pair of magazines for vertical stacks of laminations, a support for a coil between the bottom ends of the magazines, a pair of plungers for pushing groups of laminations at the bottoms of said stack toward the location of the coil support, a cement reservoir, a pump and tubing associated therewith for conveying cement from said reservoir to the location of the opening in a coil held in said coil support, and a driving mechanism for said plungers and said pump, said driving mechanism including connecting devices interposed before said driven elements for making the operative driving connections alternately advancing and retracting the plungers, the connecting devices being arranged with an advance driving section for the plunger, a driving section for the cement pump, a further advance driving section for the plunger and a retracting section for the plunger.

15. In apparatus for assembling stacked laminations with conductive winding structures or coils having a magazine for a vertical stack of laminations and a reciprocating plunger for pushing a group of laminations from the bottom of said stack horizontally, a movable hold-back block for holding back the center portion of the group of laminations pushed by the plunger, said hold-back block comprising two parts relatively movable up and down, each of which has a projecting lug which extends into the path of motion of the plunger when the hold-back block is at the end of its range of movement, one of the said hold-back block parts having its lower surface below that of the other and having its lug spaced above its lower surface far enough to permit passing a relatively small number of laminations under the said projecting lug, the other of said hold-back block parts having a spring flange along its top surface projecting above the lug of the upper hold-back block part with sufficient spacing to permit passing a relatively small number of laminations, said spring flange having a curled lip transversely projecting for causing the flange to ride along the top surface of a group of laminations approaching the hold-back block lugs for passing a small number of laminations at the top of the approaching group and holding back the center portion thereof.

16. Apparatus for gaging or counting out laminations comprising a magazine for holding laminations stacked together with surfaces parallel and in contact, a member with a surface defining the end of the magazine, a plunger slidable along said surface and of such thickness as to engage substantially the desired number of laminations for pushing them from the end of the magazine transversely, the plunger having an edge slidable along said surface and an edge part spaced therefrom a distance representing the thickness of a group of laminations to be gaged, said magazine having a stop member with an edge part spaced substantially the same distance from said surface, and one of said last two mentioned edge parts being resiliently mounted movable in a direction perpendicular to said surface to form escape mechanism for preventing jamming of the plunger by modifying the actual gaged thickness sufficiently to allow for a portion of a lamination extending beyond the edge of the stop member in order to prevent catching a lamination between the plunger and the stop member.

ARMIN F. MITTERMAIER.